United States Patent
Deegan et al.

(10) Patent No.: US 6,796,107 B2
(45) Date of Patent: Sep. 28, 2004

(54) METHOD AND APPARATUS FOR PACKAGING ULTRA FINE POWDERS INTO CONTAINERS

(75) Inventors: David Edward Deegan, Gloucestershire (GB); Timothy Paul Johnson, Gloucestershire (GB); Christopher David Chapman, Gloucestershire (GB)

(73) Assignee: Tetronics Limited (GB)

( * ) Notice: Subject to any disclaimer, the term of this patent is extended or adjusted under 35 U.S.C. 154(b) by 0 days.

(21) Appl. No.: 10/220,075

(22) PCT Filed: Feb. 28, 2001

(86) PCT No.: PCT/GB01/00861
§ 371 (c)(1),
(2), (4) Date: Nov. 4, 2002

(87) PCT Pub. No.: WO01/64521
PCT Pub. Date: Sep. 7, 2001

(65) Prior Publication Data
US 2003/0101690 A1 Jun. 5, 2003

(30) Foreign Application Priority Data
Feb. 29, 2000 (GB) .................................. 0004845

(51) Int. Cl.[7] .............................................. B65B 31/04
(52) U.S. Cl. ............................... 53/432; 53/468; 53/90; 53/94; 141/5; 141/292
(58) Field of Search ....................... 53/432, 468, 90, 53/94, 97, 98, 101, 102, 107; 141/4, 5, 202, 207, 291, 292, 293, 301, 302, 346; 220/237, 252

(56) References Cited

U.S. PATENT DOCUMENTS

| | | | |
|---|---|---|---|
| 2,284,551 A | | 5/1942 | Alexander |
| 2,694,515 A | * | 11/1954 | Green .......................... 141/301 |
| 2,991,601 A | * | 7/1961 | Glatter et al. ................. 53/432 |
| 3,989,512 A | | 11/1976 | Sayce |
| 4,112,288 A | | 9/1978 | Pieren et al. |

(List continued on next page.)

FOREIGN PATENT DOCUMENTS

| | | |
|---|---|---|
| DE | 2755213 | 6/1979 |
| EP | 0 510 816 A2 | 10/1992 |
| EP | 0615083 A | 9/1994 |

(List continued on next page.)

OTHER PUBLICATIONS

Ageorges H. et al: "Synthesis of Aluminum Nitride in Trnasferred Arc Plasma Furnaces" Plasma Chemistry & Plasma Processing, US, Plenum Press, New York, vol. 13, No. 4, Dec. 13, 1993.
Database WPI Section Ch. Week 197813 Derwent Pub. Ltd., London, GB; AN 1978–23971A XP002170899.

*Primary Examiner*—Louis Huynh
(74) *Attorney, Agent, or Firm*—Morris, Manning & Martin

(57) ABSTRACT

The apparatus comprises a powder dispenser portion with an outlet port which opens into a loading chamber. A slide gate valve assembly selectively closes the port and a disc valve assembly is provided above the slide gate valve assembly. Containers are loaded into the loading chamber and are located beneath the port and are then purged with inert gas. The slide gate valve assembly and disc valve assembly are then opened to allow container to be filled with ultra fine powder.

15 Claims, 2 Drawing Sheets

U.S. PATENT DOCUMENTS

| | | | |
|---|---|---|---|
| 4,194,107 A | | 3/1980 | Klasson |
| 4,238,427 A | | 12/1980 | Chisholm |
| 4,299,338 A | * | 11/1981 | Jain et al. .................... 222/545 |
| 4,638,488 A | | 1/1987 | Shimomoto |
| 4,856,681 A | * | 8/1989 | Murray ........................ 141/372 |
| 4,861,961 A | | 8/1989 | Huys |
| 4,877,937 A | | 10/1989 | Muller |
| 5,091,750 A | * | 2/1992 | Yoshida et al. ............. 141/366 |
| 5,263,521 A | | 11/1993 | Brossard et al. |
| 5,332,885 A | | 7/1994 | Landes |
| 5,408,066 A | | 4/1995 | Traani et al. |
| 5,420,391 A | | 5/1995 | Delcea |
| 5,481,080 A | | 1/1996 | Lynum et al. |
| 5,484,004 A | * | 1/1996 | Bolz .......................... 141/346 |
| 5,490,546 A | * | 2/1996 | Lhoest ........................ 141/346 |
| 5,555,995 A | * | 9/1996 | Galer ......................... 220/324 |
| 5,588,473 A | * | 12/1996 | Glachet ....................... 141/292 |
| 5,593,740 A | | 1/1997 | Struban et al. |
| 6,063,243 A | | 5/2000 | Zettl et al. |
| 6,146,505 A | | 11/2000 | Mashario et al. |
| 6,293,316 B1 | * | 9/2001 | Bertolotti et al. ........... 141/302 |
| 6,305,443 B1 | * | 10/2001 | Semenenko ................ 141/301 |
| 6,311,745 B1 | * | 11/2001 | Welch et al. ............... 141/346 |

FOREIGN PATENT DOCUMENTS

| | | |
|---|---|---|
| EP | 0 776 502 | 4/1997 |
| FR | 2 450 548 | 9/1980 |
| GB | 1 010263 | 11/1965 |
| GB | 1 142 793 | 9/1969 |
| GB | 1 339 054 | 11/1973 |
| GB | 2 273 027 | 6/1994 |
| JP | 55 046603 B | 4/1980 |
| JP | 58031825 A | 2/1983 |
| JP | 32 64601 A | 11/1991 |
| JP | 06080410 | 3/1994 |
| JP | 06272047 | 9/1994 |
| JP | 62 99209 A | 10/1994 |
| JP | 07300116 A | 11/1995 |
| JP | 1059485 | 8/1996 |
| JP | 10059485 A | 8/1996 |
| JP | 8243756 | 9/1996 |
| JP | 872 43756 A | 9/1996 |
| JP | 63 147 182 A | 6/1998 |
| JP | 10216959 A | 8/1998 |
| WO | WO 9415864 A | 7/1994 |
| WO | WO 99/31296 | 6/1999 |

* cited by examiner

METHOD AND APPARATUS FOR PACKAGING ULTRA FINE POWDERS INTO CONTAINERS

FIELD OF THE INVENTION

The present invention relates to a method and apparatus for packaging ultra fine powders into containers.

BACKGROUND OF THE INVENTION

Ultra fine powders of less than 1 micron in unit dimension and particularly nanometric powders of less than 100 nanometres unit dimension have a high surface area to weight ratio. Due to the high surface energy the powders are easily contaminated and in some cases react vigorously with air. In order to keep the powders in an as-produced form it is necessary to store them in an unreactive medium such as inert gas and other fluid media. The present invention provides a way in which the powders can be cleared from the reaction production apparatus in a non-reactive environment and in a manner that is repeatable and suitable for mass production.

SUMMARY OF THE INVENTION

According to a first aspect of the present invention, there is provided a method for packaging ultra fine powders into containers in a controlled environment in a sealed apparatus in which the internal environment does not react with the powder and which comprises a powder delivery chamber to which a supply of the powder is supplied from the reaction production apparatus, the powder delivery chamber having a port for receiving a container, the port being selectively closable by a first valve which seals the port, wherein each container is closable by a second valve which seals the container; the method comprising the steps of closing the first valve to seal the port; attaching a container to the port; opening the first valve; with the second valve also open, introducing powder into the container; closing the first and second valves to seal the port and the container; and disconnecting the container from the port.

The use of the two valves one of which seals the port and the other of which seals the container allows the controlled environment within the apparatus to be preserved, and also provides a method which is suitable for mass production. The supply of the containers to the apparatus can readily be automated. Also, the method allows the powder to be supplied continuously to the powder delivery chamber, while the powder is removed as a batch process in the containers.

The first and second valves can be of any type which are capable of sealing the port or the container as the case may be. It is preferable for the valves to be operable independently of one another. Preferably, at least one of the first and second valves is a sliding gate type valve, in which a gate member is slidable between an open configuration in which it does not obstruct the port or the entrance to the container, and a closed configuration in which it seals against the port or the entrance to the container. Preferably, the plate is provided with at least one ramp surface which cooperates with a complementary ramp in a valve housing, whereby sliding of the plate with respect to the housing forces the ramp surface to ride up the ramp hence forcing the plate into sealing engagement with the port or container. Preferably, the port and/or container is/are surrounded by at least by one O-ring against which the plate is sealed.

It is possible that, as each container is processed, some reactive gas will leak into the powder delivery chamber of the apparatus. One way of reducing this problem is to house the lowermost part of the powder delivery chamber and the container being processed within a loading chamber filled with non-reactive gas. Preferably, the loading chamber is purged, hence purging the container.

However, even then, some reactive gas may come into contact with the powder. Therefore, preferably, a third valve is provided which is arranged to selectively isolate the part of the powder delivery chamber having the port from the remainder of the powder delivery chamber, thereby defining an intermediate chamber between the first and third valves, a supply of non-reactive gas is provided to the intermediate chamber, and a purge line leads from the intermediate chamber, the method further comprising purging the intermediate chamber with non-reactive gas with the first and third valves closed until the amount of reactive gas in the intermediate chamber reaches an acceptably low level.

According to a second aspect of the invention, there is provided a combination of an apparatus for packaging ultra fine powders into containers, and at least one container, the apparatus comprising a sealed unit arranged to contain a non-reactive environment, a powder delivery chamber arranged to receive a supply of powder, the powder delivery chamber having a port for receiving a container, the port being selectively closable by a first valve which seals the port; the container being closable by a second valve which seals the container, and the container having a surface which is arranged to sealably engage with the port.

BRIEF DESCRIPTION OF THE DRAWINGS

An example of a method and apparatus in accordance with the present invention will now be described with reference to the accompanying drawings, in which.

DESCRIPTION OF THE PREFERRED EMBODIMENTS

Figure 1:
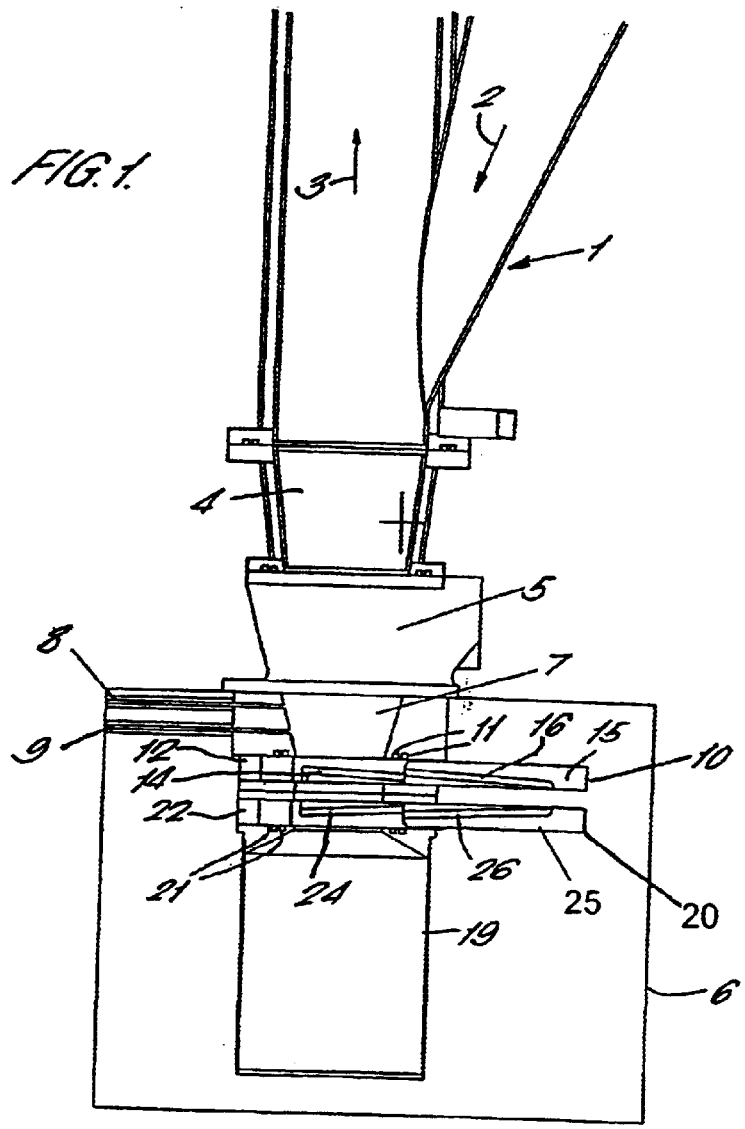
FIG. 1 is a schematic cross-section through a filling apparatus with a container connected.
Figure 3:
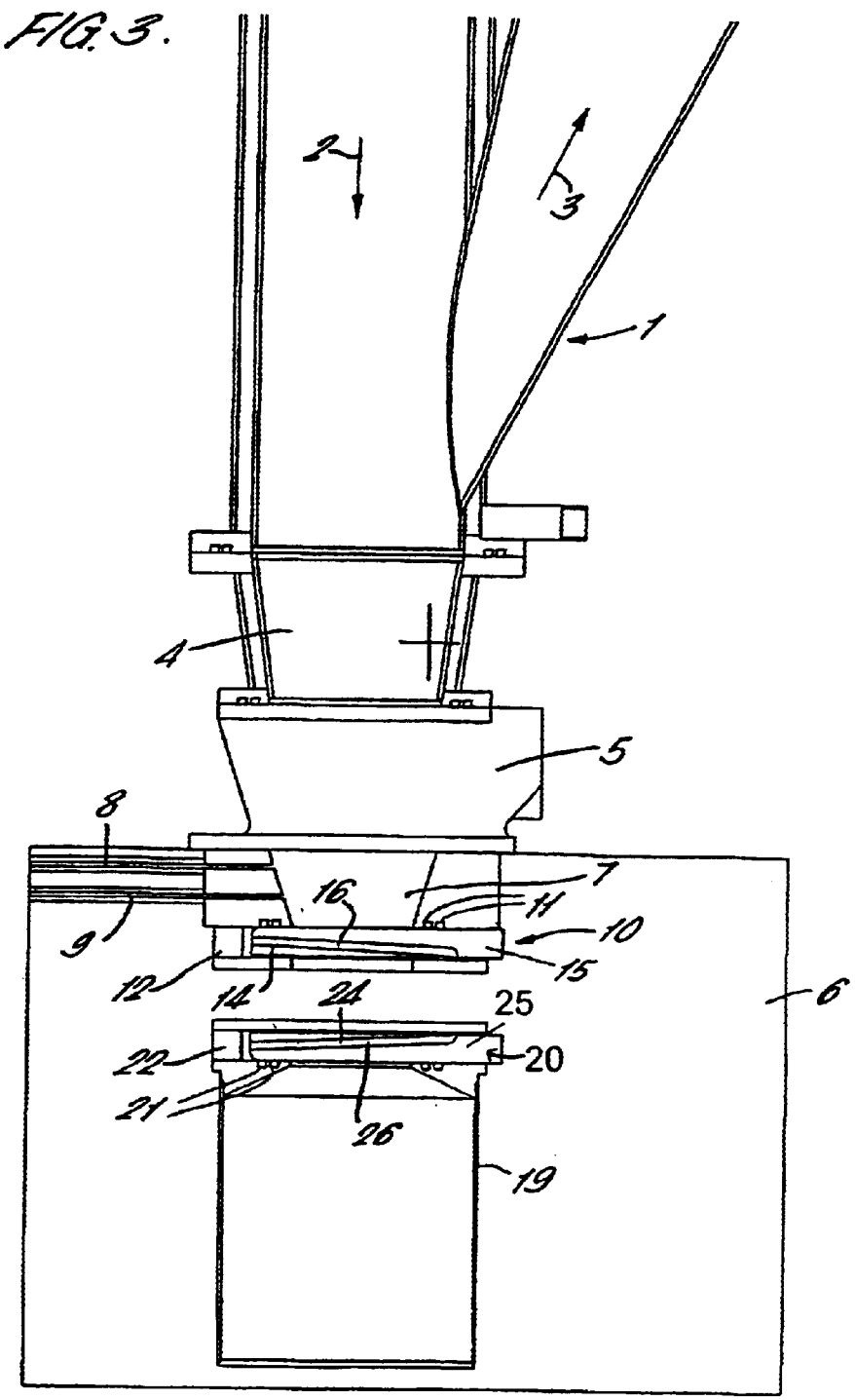
FIG. 3 is a view similar to FIG. 1 with a container detached from the apparatus.

The apparatus shown in FIGS. 1 and 3 comprises at its uppermost end a powder delivery conduit 1 which has a Y-shape configuration. The ultra fine powder entrained in inert gas is fed downwardly though the right hand branch of the conduit 1 in a direction of arrow 2 and reverses its direction to flaw up the left hand branch of the conduit 1 in the direction of arrow 3 and impinges on a filter cloth or bag (not shown) where the powder is compacted. Periodically, a gas pulse and/or vibration is applied to the cloth or bag to dislodge agglomerated particles of the powder which fall downwardly against the flow up the left hand branch of the conduit 1 into a collection chamber 4. Agglomerated powder is required to settle under the action of gravity. These agglomerates can be refragmented using weak mechanical forces (such as sonication). The lower end of the collection chamber 4 is sealed by a sealed disc valve assembly 5 of conventional construction. The temperature in the collection chamber 4 is monitored using a thermocouple and the disc valve assembly will only operate when the temperature drops to a defined level below the auto-ignition temperature of the collected material.

Beneath the disc valve assembly 5 is a loading chamber 6 which is filled with low but above atmospheric pressure inert gas.

Figure 2:
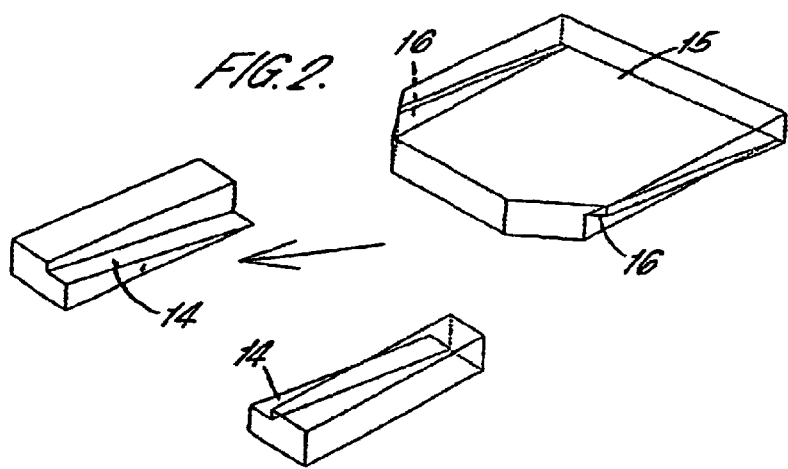
FIG. 2 is a perspective view showing a single sliding gate valve.

An intermediate chamber 7 is connected and sealed directly below the disc valve assembly 5 within the loading chamber 6. A high pressure inert gas supply line 8 leads to the intermediate chamber 7, while a purge line 9 leads from the intermediate chamber 7. Both lines are provided with control valves (not shown) to control the flow therethrough. Below the intermediate chamber is a first motorised pneumatic slide gate valve assembly 10 which is arranged to selectively seal the lower end of the intermediate chamber. This assembly comprises a pair of concentric O-rings 11 which surround the lowermost end of the intermediate chamber 7. A housing 12 depends beneath the intermediate chamber 7. The housing 12 is spaced from the lowermost surface of the intermediate chamber 7, and supports a pair of ramps 14 as best shown in FIG. 2. A sliding gate member 15 is provided with a pair of complementary ramp surfaces 16 which cooperate with the ramps 14. The valve is shown in an open configuration in FIG. 1, in which the gate member 15 is retracted from the housing 12, thereby leaving the bottom of the intermediate chamber 7 open. The gate member is shown closed in FIG. 3, in which the gate member 15 has been slid fully into the housing 12. During the latter part of its travel, the ramps 14 engage with the ramp surfaces 16, so that further movement of the gate member 15 into the housing 12 forces the gate member up against the O-rings 11, thereby sealing the bottom of the intermediate chamber 7.

As shown in FIGS. 1 and 3, a container 19 to be fitted to the delivery apparatus has a slide gate valve assembly 20 fitted to its uppermost surface. This slide gate valve assembly 20 has an identical configuration to the slide gate valve assembly 10, but is shown in an inverted configuration. A full description of this assembly 20 will therefore not be included here. However, the reference numerals used in FIGS. 1 and 3 relate to those used for the slide gate valve assembly 10, except that each numeral begins with a 2 instead of a 1. Thus, the slide gate valve assembly has O-rings 21, a housing 22, ramps 24, a gate member 25 and ramp surfaces 26.

The equipment is earth bonded to allow for the dissipation of static charge.

The operation of the apparatus will now be described.

Before use, the collection chamber 4 and the intermediate chamber 7 are purged with inert gas. This gas is supplied to the equipment using remote solenoid valve control. Pressure acting known return valves are also provided to over-pressurising equipment during this purging operation.

The oxygen content within the equipment is continually monitored using a solid state zirconia cell device which is fitted with a pump to draw samples from both the collection chamber 4 and the loading chamber 6.

A container 19 is introduced into the loading chamber 6. The container 19 is brought into position beneath the intermediate chamber 7. The movement of the container into this position can be accomplished by a system of guide grooves along which the container is moved in order to bring it into the desired position. Initially, gate member 15 and disc valve assembly 5 are closed. At this point the chamber 6 is purged with inert gas. The inert gas is supplied to the chamber 6 using remote solenoid valve control and pressure acting known return valves to avoid over-pressurising the chamber. Although the container 19 is against the housing 12, it is not sealed against it. Therefore, when the chamber 6 is purged, the vessel 19 is also purged as the purge gas is heavier than the atmospheric air within the vessel and therefore displaces the atmospheric air. The gap between the vessel 19 and the housing 12 is sufficient to allow gas flow, but is small enough to prevent material escaping into the chamber 6. The gate member 15 is opened followed by the disc valve assembly 5. There is now a complete path all the way down from the intermediate chamber 7 into the container 19.

Then, as described above, the powder drops down through the entire assembly and into the container 19. The gas purge through lines 8 and 9 is pulsed intermittently at this time to encourage the flow of material into the container 19. Once the container 19 is filled to the desired level, the disc valve assembly 5, then the gate member 15 IS closed. This isolates the intermediate chamber 7 from the collection chamber 4, although both chambers have the same gaseous environment. Gate member 25 is then closed. With the slide gate valve assemblies closed, the container 19 together with the gate member 25 can be released from its engagement with the slide gate valve assembly 10, and can be replaced by an empty container. The slide gate valve assembly 20 may be latched closed and/or spring loaded to ensure that the seal is maintained during further handling of the container. The chamber 6 is now opened to atmosphere and the container with the gate member 25 as its lid is removed. A new container is then placed into the chamber 6 with its lid open, and the above described process is repeated as often as necessary.

What is claimed is:

1. A method for packaging ultra fine powders into containers in a controlled environment in a sealed apparatus in which the internal environment does not react with the powder and which comprises a powder delivery chamber to which a supply of the powder is supplied from a reaction production apparatus, the powder delivery chamber having a port for receiving a container, the port being selectively closable by a first valve which seals the port, wherein each container is closable by a second valve which seals the container, the method comprising the steps of:

closing the first valve to seal the port;
attaching a container to the port;
opening the first valve;
with the second valve also open, introducing powder into the container;
closing the first and second valves to seal the port and the container; and,
disconnecting the container from the port;

wherein the lowermost part of the powder delivery chamber is housed within a loading chamber, and the method further comprises:

loading the container into the loading chamber; and,
purging the loading chamber and hence the container.

2. A method according to claim 1, wherein at least one of the first and second valves is a sliding gate type valve, in which a gate member is slidable between an open configuration in which it does not obstruct the port of the entrance to the container, and a closed configuration in which it seals against the port or the entrance to the container.

3. A method according to claim 2, wherein a third valve is provided which is arranged to selectively isolate the part of the powder delivery chamber having the port from the remainder of the powder delivery chamber, thereby defining an intermediate chamber between the first and third valves, a supply of non-reactive gas is provided to the intermediate chamber, and a purge line leads from the intermediate chamber, the method further comprising purging the intermediate chamber with non-reactive gas with the first and third valves closed until an amount of reactive gas in the intermediate chamber reaches an acceptably low level.

4. A method according to claim 2, wherein the lowermost part of the powder delivery chamber is housed within a loading chamber, and the method further comprises loading a container into the loading chamber, and purging the loading chamber and hence the container.

5. A method according to claim 2, wherein the gate member is provided with at least one ramp surface which cooperates with a complementary ramp in a valve housing whereby sliding of the gate member with respect to the housing forces the ramp surface to ride up the ramp hence forcing the gate member into sealing engagement with the port or container.

6. A method according to claim 5, wherein the lowermost part of the powder delivery chamber is housed within a loading chamber, and the method further comprises loading a container into the loading chamber, and purging the loading chamber and hence the container.

7. A method according to claim 5, wherein a third valve is provided which is arranged to selectively isolate the part of the powder delivery chamber having the port from the remainder of the powder delivery chamber, thereby defining an intermediate chamber between the first and third valves, a supply of non-reactive gas is provided to the intermediate chamber, and a purge line leads from the intermediate chamber, the method further comprising purging the intermediate chamber with non-reactive gas with the first and third valves closed until the amount of reactive gas iii the intermediate chamber reaches an acceptably low level.

8. A method according to claim 5, wherein the port or container is surrounded by at least by one O-ring against which the gate member is sealed.

9. A method according to claim 1, wherein a third valve is provided which is arranged to selectively isolate the part of the powder delivery chamber having the port from the remainder of the powder delivery chamber, thereby defining an intermediate chamber between the first and third valves, a supply of non-reactive gas is provided to the intermediate chamber, and a purge line leads from the intermediate chamber, the method further comprising purging the intermediate chamber with non-reactive gas with the first and third valves closed until the amount of reactive gas in the intermediate chamber reaches an acceptably low level.

10. A combination of an apparatus for packaging ultra fine powders into containers, and at least one container, the apparatus comprising a sealed unit arranged to contain a non-reactive environment, a powder delivery chamber arranged to receive a supply of powder, the powder delivery chamber having a port for receiving a container, the port being selectively closable by a first valve which seals the port and opening into a loading chamber for receiving the container, the loading chamber having a purge gas circuit to allow the loading chamber and the container therein to be purged; the container being closable by a second valve which seals the container, and the container having a surface which is arranged to engage with the port, wherein a third valve is provided which is arranged to selectively isolate the part of the powder delivery chamber having the port from the remainder of the powder delivery chamber, thereby defining an intermediate chamber between the first and third valves, a supply of non-reactive gas is provided to the intermediate chamber, and a purge line leads from the intermediate chamber.

11. A combination according to claim 10, wherein at least one of the first and second valves is a sliding gate type valve, in which a gate member is slidable between an open configuration in which it does nor obstruct the port or the entrance to the container, and a closed configuration in which it seals against the port or the entrance to the container.

12. A combination according to claim 11, wherein a third valve is provided which is arranged to selectively isolate the part of the powder delivery chamber having the port from the remainder of the powder delivery chamber, thereby defining an intermediate chamber between the first and third valves, a supply of non-reactive gas is provided to the intermediate chamber, and a purge line leads from the intermediate chamber.

13. A combination according to claim 11, wherein the gate member is provided with at least one ramp surface which cooperates with a complementary ramp in a valve housing, whereby sliding of the gate member with respect to the housing forces the ramp surface to ride up the ramp hence forcing the gate member into sealing engagement with the port or container.

14. A combination according to claim 13, wherein the port or container is surrounded least which the gate member is sealed.

15. A combination according to claim 13, wherein a third valve is provided which is arranged to selectively isolate the part of the powder delivery chamber having the port from the remainder of the powder delivery chamber, thereby defining an intermediate chamber between the first and third valves, a supply of non-reactive gas is provided to the intermediate chamber, and a purge line leads from the intermediate chamber.

\* \* \* \* \*